United States Patent
Hunt (12)

(10) Patent No.: US 6,353,882 B1
(45) Date of Patent: Mar. 5, 2002

(54) REDUCING BRANCH PREDICTION INTERFERENCE OF OPPOSITE WELL BEHAVED BRANCHES SHARING HISTORY ENTRY BY STATIC PREDICTION CORRECTNESS BASED UPDATING

(75) Inventor: Douglas B. Hunt, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/614,043

(22) Filed: Jul. 11, 2000

Related U.S. Application Data

(63) Continuation of application No. 09/028,258, filed on Feb. 23, 1998, now Pat. No. 6,151,672.

(51) Int. Cl.$^7$ .................................................. G06F 9/38
(52) U.S. Cl. ....................................... 712/239; 712/240
(58) Field of Search ................................ 712/239, 240

(56) References Cited

U.S. PATENT DOCUMENTS

| | | | |
|---|---|---|---|
| 5,442,756 A | | 8/1995 | Grochowski et al. ........ 712/238 |
| 5,454,117 A | | 9/1995 | Puziol et al. .................. 712/23 |
| 5,687,360 A | * | 11/1997 | Chang ......................... 712/240 |
| 5,740,416 A | | 4/1998 | McMahan .................... 712/238 |
| 5,752,014 A | * | 5/1998 | Mallick et al. .............. 712/240 |
| 5,805,878 A | * | 9/1998 | Rahman et al. ............. 712/239 |
| 5,815,699 A | | 9/1998 | Puziol et al. ................. 712/239 |
| 5,901,307 A | * | 5/1999 | Potter et al. ................. 712/240 |
| 5,928,358 A | * | 7/1999 | Takayama et al. .......... 712/239 |
| 5,978,909 A | * | 11/1999 | Lempel ....................... 712/240 |
| 6,108,777 A | * | 8/2000 | Puziol et al. ................ 712/240 |

FOREIGN PATENT DOCUMENTS

| | | |
|---|---|---|
| EP | 0320098 | 6/1989 |
| EP | 0381444 | 8/1990 |

OTHER PUBLICATIONS

"PA–8000 Combines Complexity and Speed: HP Aims to Retake Performance Lead—But Not Until 1Q96", L. Gwennap, Nov. 14, 1994, 22 pages.
"Compiler Optimizations for the PA–8000", A. Holler, Feb. 1997, 16 pages.
"PA–8500: The Continuing Evolution of the PA–8000 Family", G. Lesartre & D. Hunt, Feb. 23, 1997, 6 pages.
"The Agree Predictor: A Mechanism for Reducing Negative Branch History Interference", E. Sprangle, R. Chappell, M. Alsup & Y. Patt, Jun. 1997, pp. 284–291.
"Advanced Performance Features of the 64–BIT PA–8000", D. Hunt, Mar. 5, 1995, 7 pages.
"New Algorithm Improves Branch Prediction—Better Accuracy Required for Highly Superscalar Designs" by L. Gwennap, Mar. 27, 1995, pp. 17–21.

(List continued on next page.)

*Primary Examiner*—Kenneth S. Kim

(57) ABSTRACT

Interference in a branch history table of a microprocessor is reduced by methods and apparatus which predict the outcome of branch instructions (taken or not taken) through a combination of static and dynamic prediction techniques. Static prediction information (e.g., a compiler hint) may be stored in instruction memory, and dynamic prediction information is stored in a branch history table. A branch prediction results from an exclusive OR of static and dynamic prediction information. After execution of a branch instruction, an indication as to whether a branch was taken or not taken is exclusively ORed with the static prediction information for the branch instruction, and the result of this exclusive OR is used to update an appropriate entry in the branch history table. Using the methods and apparatus disclosed herein, two well-behaved branches may share an entry in a branch history table, yet not interfere with one another (even when the two well-behaved branches include one which is mostly taken, and one which is mostly not taken).

9 Claims, 4 Drawing Sheets

OTHER PUBLICATIONS

"A Study of Branch Prediction Strategies", J. Smith, 1981, pp. 135–148.

"Two–Level Adaptive Training Branch Prediction", Nov. 18, 1991, pp. 51–50, T. Yeh and Y. Patt.

"Correlation and Aliasing in Dynamic Branch Predictors", S. Sechrest, C. Lee, & T. Mudge, May 1996, pp. 22–32.

Burch, Carl, : "PA–8000: A Case of Static and Dynamic Branch Prediction"; Oct. 12, 1997; p. 98, paragraph 4; p. 99, paragraph 6; IEEE, 1997.

IBM Corp.; "Polymorphic Branch Predictor"; 07–94; p. 111, line 3; p. 112, line 14; IBM Technical Disclosure Bulletin; Jul., 1994.

Young, Cliff, et al.; "Improving the Accuracy of Static Branch Prediction Using Branch Correlation"; 11–94; vol. 29, No. 11; ACM Sigplan Notices; Nov. 29, 1994.

Mahlke, Scott et al.; "Compiler Synthesized Dynamic Branch Prediction"; Dec. 2, 1996; vol. SYMP 29; IEEE, 1996.

"The Impact of Branch Prediction Table Interference on Branch Prediction Scheme Performance", A. Talcott, W. Yamamoto, N. Sankar, R. Wood, & M. Nemirovsky, 1995, 17 pages.

"Branches Prediction Strategies and Branch Target Buffer Design", J Lee and A. Smith, Jan. 1984, pp. 6–22.

"HP Pumps Up PA–8x00 Family: PA–8200 in 2Q97, PA–8500 in 2Q98 Aim to Grab Performance Lead", Linley Gwennap, Oct. 28, 1996, 7 pages.

"Combining Branch Predictors", Scott McFarling, WRL Technical Note TN–36, Jun. 1993, pp. 1–25.

"Branch Prediction Methods Used in Modern Superscalar Processors", S. Atukorala, IEEE Information, Communication and Signal Processing, 1997, pp. 1475–1479.

* cited by examiner

REDUCING BRANCH PREDICTION INTERFERENCE OF OPPOSITE WELL BEHAVED BRANCHES SHARING HISTORY ENTRY BY STATIC PREDICTION CORRECTNESS BASED UPDATING

CROSS REFERENCE TO RELATED APPLICATION(S)

This is a continuation of application Ser. No. 09/028,258 filed on Feb. 23, 1998, now issued U.S. Pat. No. 6,151,672.

FIELD OF THE INVENTION

The invention pertains to the maintenance and use of a branch history table in a microprocessor.

BACKGROUND OF THE INVENTION

Most modern computers, including those that execute instructions out-of-order and/or via a pipelined execution unit, execute instructions "speculatively". That is, instructions are executed before the instructions on which they depend have been fully executed, and quite possibly, before the outcomes of branches in the instruction stream are known. To achieve a high degree of performance, the microprocessors in these computers employ a variety of techniques to minimize the cost of erroneously predicted branches in the instruction stream. These techniques usually involve some form of "branch prediction". Branch prediction is a means of optimizing for the outcome of a branch instruction which is mostly likely to occur (either "taken" or "not taken").

Typically, a branch prediction will be based on one of two types of information: 1) static prediction information, or 2) dynamic prediction information. Static prediction information is generated prior to the execution of a computer program, and may be based on factors such as instruction type, position in the instruction stream, instruction repetition, and so on. Dynamic prediction information is generated during the execution of a computer program, and usually depends on a history of previous outcomes of a given branch and/or other branch instructions.

Dynamic prediction information is stored in a branch history table comprising a number of entries. If a branch history table was large enough, it is conceivable that a distinct history could be maintained for each branch instruction of a computer program. However, given that microprocessor chip area is a costly resource, and that branch history tables are often scaled back to make room for other important microprocessor elements, entries in a branch history table are often shared. Interference between conflicting branch histories is therefore a significant problem.

When conflicting histories share a single entry in a branch history table, the history for any given branch instruction is often corrupted by other branch instructions, thereby resulting in a mispredicted branch outcome. When a branch outcome is mispredicted, serious and costly consequences result. For example, instruction pipelines may stall, instruction execution units may be halted, caches and registers may need to be flushed, and so on. All of these consequences result in unacceptable delays.

It is therefore a primary object of this invention to provide methods and apparatus which reduce interference in a branch history table of a microprocessor, thereby yielding 1) more accurate branch predictions, and consequently 2) fewer delays caused by erroneously predicted branches.

SUMMARY OF THE INVENTION

To understand the invention, it must first be recognized that the vast majority of branches are either "almost always taken" or "almost always not taken". These branches may be referred to as "well-behaved" branches. One must also recognize that when the outcome of a branch switches, it often switches from "almost always taken" to "almost always not taken", or vice versa. It is also important to note that branch prediction schemes typically rely on the assumption that most branches are well-behaved. As a result, the goal of both static and many dynamic branch prediction schemes is to predict what the dominant outcome of a branch will be.

Recognizing the above facts, one can appreciate that the prediction accuracy of a well-behaved branch of one type (e.g., an "almost always taken" branch) is degraded when the branch shares a branch history table entry with a well-behaved branch of the other type (e.g., an "almost always not taken" branch).

The branch prediction schemes of the Hewlett-Packard Company PA-8x00 family of microprocessors (e.g., the PA-8000, PA-8200, and PA-8500) presume the above facts on well-behaved branches to be true. Hewlett-Packard Company is based in Palo Alto, Calif., USA, and the PA-8x00 family of microprocessors is described in more detail in Advanced Performance Features of the 64-bit PA-8000 by D. Hunt (Mar. 5, 1995), HP Pumps Up PA-8x00 Family: PA-8200 in 2Q97, PA-8500 in 2Q98 Aim to Grab Performance Lead by L. Gwennap (Oct. 28, 1996), and PA-8500: The Continuing Evolution of the PA-8000 Family by G. Lesartre and D. Hunt (Feb. 23, 1997). These papers are hereby incorporated by reference for all that they disclose.

Compilers which generate code for the PA-8x00 family of microprocessors are capable of encoding a "hint" in most branch instructions. These hints are a form of static prediction information, and are indication as to whether the compiler believes a given branch will be mostly taken or mostly not-taken. The compiler for the PA-8000 microprocessor is described in more detail in Compiler Optimizations for the PA-8000 by A. Holler. This paper is hereby incorporated by reference for all that it discloses.

In the achievement of the foregoing objects, the inventor has devised methods and apparatus which utilize these compiler generated hints (or any other static prediction information) to insure that two or more well-behaved branches sharing a single entry in a branch history table do not corrupt the history information stored therein. After execution of a branch instruction, an indication as to whether a branch instruction resulted in a branch being taken or not taken is exclusively ORed with the compiler generated hint for the branch instruction, and the result of this exclusive OR is used to update an appropriate entry in the branch history table. Furthermore, the outcome of a branch instruction is predicted in response to the exclusive OR of 1) the compiler generated hint, and 2) dynamic prediction information read from an appropriate entry of the branch history table.

Using the methods and apparatus disclosed herein, two well-behaved branches may share an entry in the branch history table, yet not corrupt the history information stored therein (even when the two well-behaved branches comprise one which is mostly taken, and one which is mostly not taken).

These and other important advantages and objectives of the present invention will be further explained in, or will become apparent from, the accompanying description, drawings and claims.

BRIEF DESCRIPTION OF THE DRAWINGS

An illustrative and presently preferred embodiment of the invention is illustrated in the drawings in which.

DESCRIPTION OF THE PREFERRED EMBODIMENTS

Figure 2:
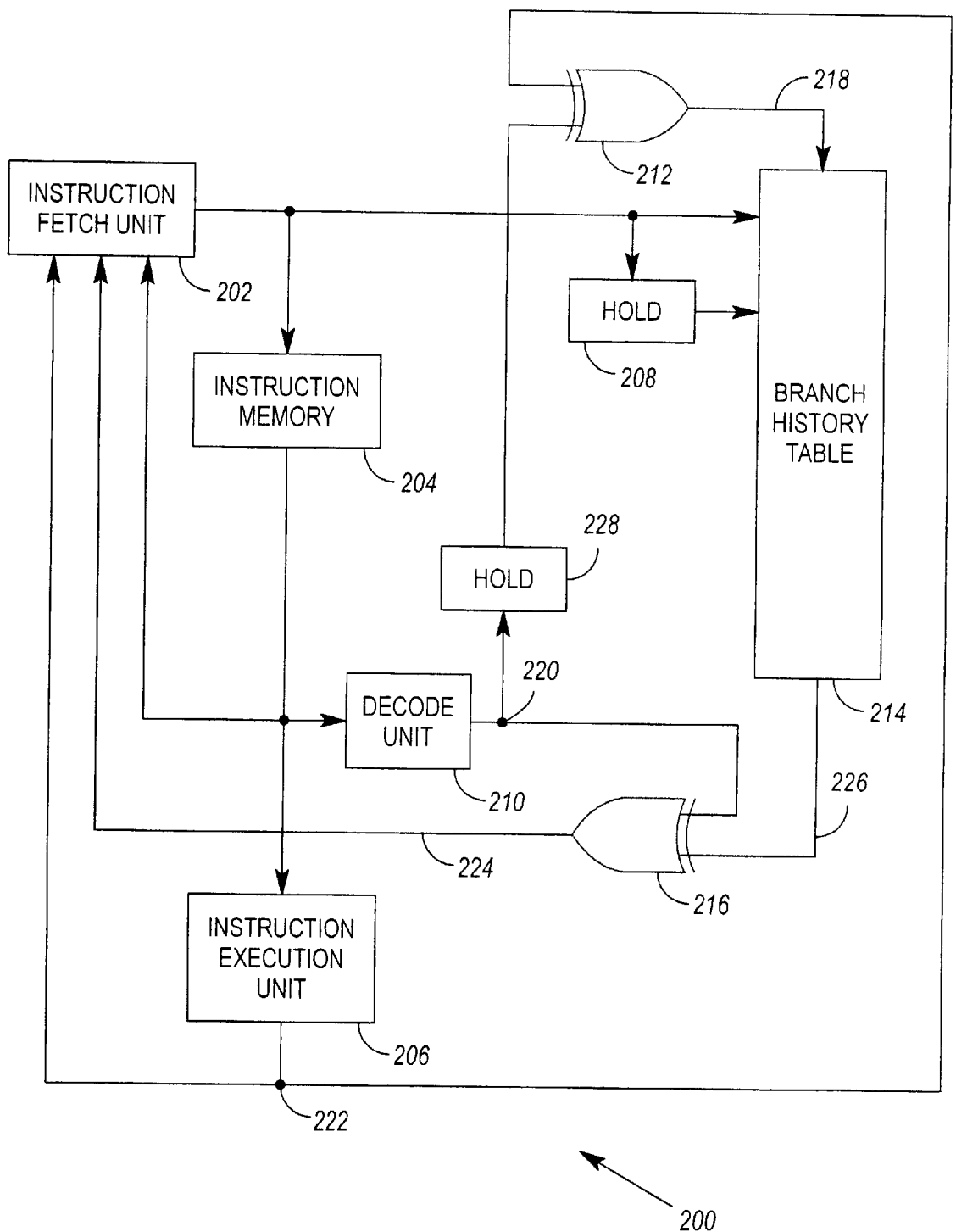
FIG. 2 illustrates a second embodiment of branch prediction hardware.

Apparatus 200 in a microprocessor for predicting whether branches identified in a plurality of branch instructions will be taken or not taken is illustrated in FIG. 2, and may generally comprise a branch history table 214, one or more data storage locations 204 for storing static prediction information corresponding to a plurality of branch instructions, and first 216 and second 212 logic gates. The branch history table 214 comprises a plurality of entries. The first logic gate 216 comprises an input for receiving static prediction information 220 derived from an addressed one of the one or more data storage locations 204, an input for receiving information 226 derived from at least one entry in the branch history table 214, and a branch prediction output 224 which is indicative of whether one of the plurality of branch instructions will be taken or not taken. The second logic gate 212 comprises an input for receiving static prediction information 220 derived from an addressed one of the one or more data storage locations 204, an input for receiving information 222 which is indicative of whether a branch identified in a branch instruction was taken or not taken, and a branch history update output 218 which is indicative of whether the static prediction information corresponding to a branch instruction was correct. The branch history update output 218 is received by the branch history table 214.

Figure 3:
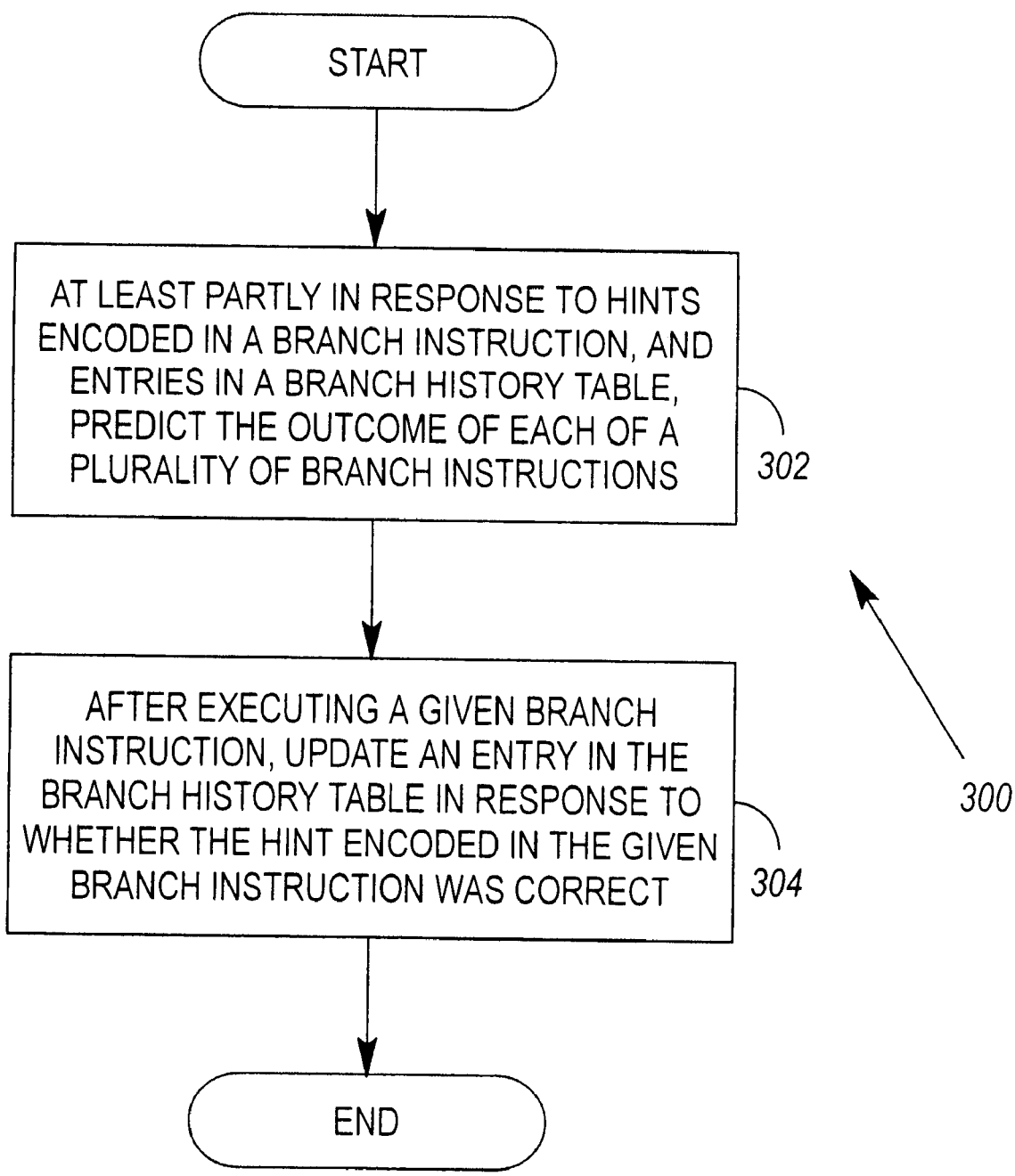
FIG. 3 illustrates a method of predicting outcomes of a plurality of branch instructions executed in a microprocessor.

A method 300 of reducing interference in a branch history table 214 of a microprocessor (which might utilize the above described apparatus 200) is illustrated in FIG. 3, and may generally comprise predicting 302 outcomes of a plurality of branch instructions in a computer program, and updating 304 an entry in a branch history table 214 after execution of a given branch instruction. The outcomes of branch instructions are predicted 302 at least partly in response to hints encoded in the branch instructions, and entries in the branch history table 214. The branch history table 214 is updated 304 at least partly in response to whether the hint encoded in the given branch instruction was correct.

Figure 4:
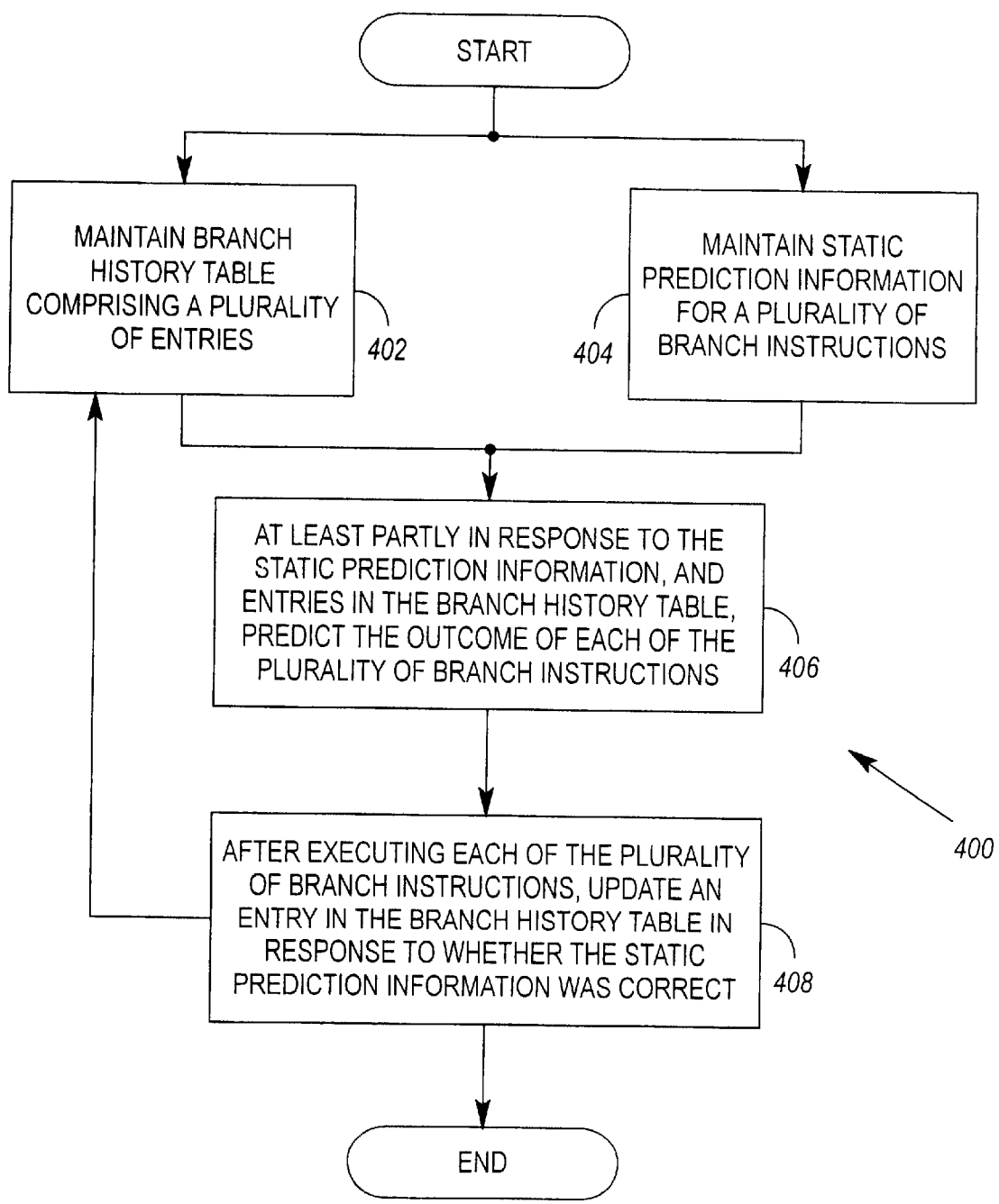
FIG. 4 illustrates a method of reducing interference in a branch history table of a microprocessor.

A method 400 of predicting outcomes of a plurality of branch instructions executed in a microprocessor which might (which also might utilize the above described apparatus 200) is illustrated in FIG. 4, and may generally comprise 1) maintaining 402 a branch history table 214 comprising a plurality of entries, 2) maintaining 404 static prediction information for a plurality of branch instructions, 3) predicting 406 outcomes of the plurality of branch instructions, and 4) updating 408 an entry in the branch history table 214 after execution of each of the plurality of branch instructions. Outcomes of branch instructions are predicted 406 at least partly in response to 1) the static prediction information 220, and 2) an entry in the branch history table 214. The branch history table 214 is updated at least partly in response to whether the static prediction information 220 was correct.

Having described the above methods 300, 400 and apparatus 200 in general, the methods 300, 400 and apparatus 200 will now be described with more particularity.

Figure 1:
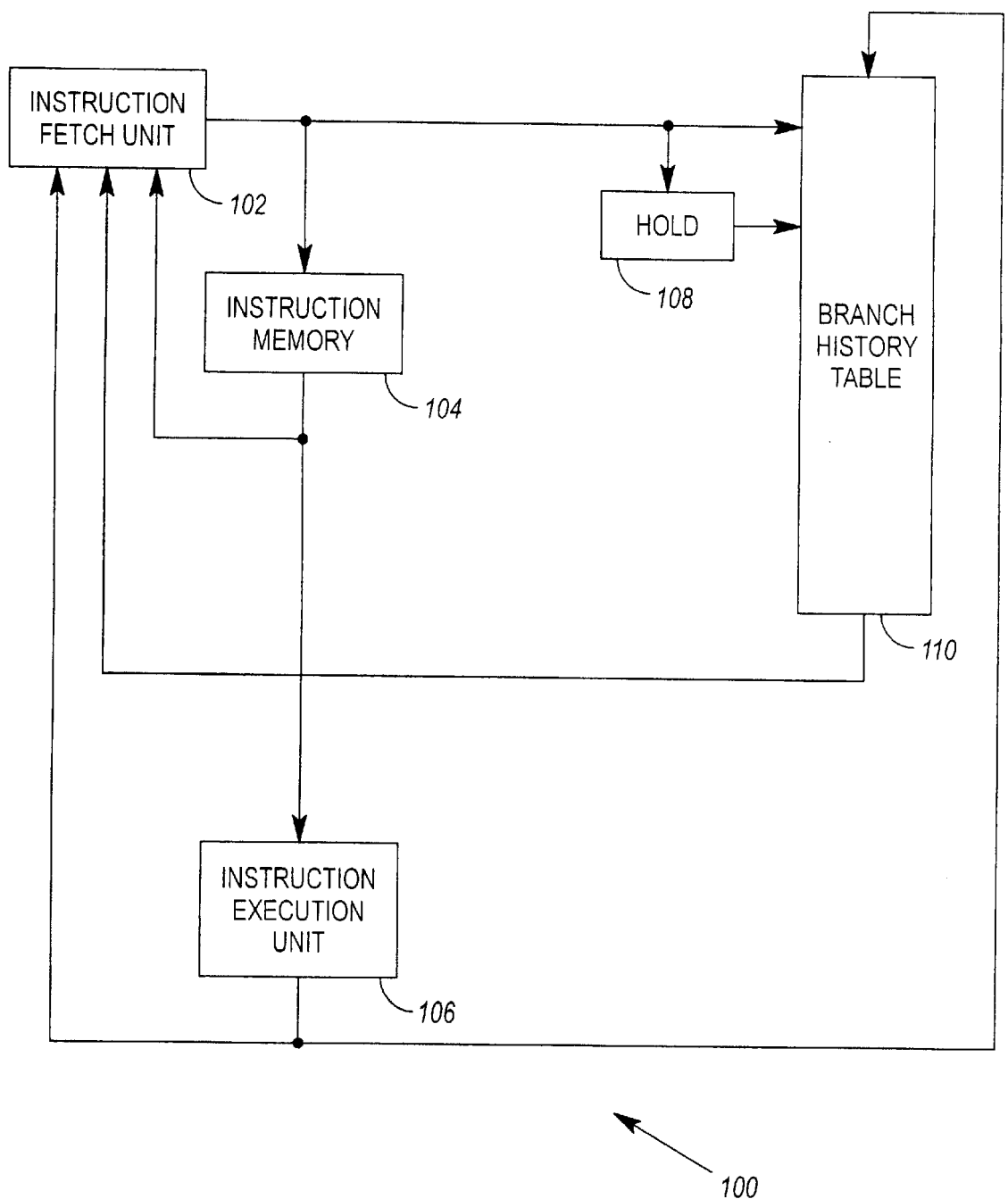
FIG. 1 illustrates a first embodiment of branch prediction hardware.

A high-level schematic of branch prediction hardware 100 existing in Hewlett-Packard Company's PA-8000 and PA-8200 microprocessors, which serves as a basis for implementing the preferred embodiments of the methods 300, 400 and apparatus 200 disclosed herein, is illustrated in FIG. 1. In general, the branch prediction hardware 100 of these computers comprises an instruction fetch unit 102, an instruction memory 104, an instruction execution unit 106, and a branch history table 110.

The instruction fetch unit 102 generates addresses of instructions to be executed in response to inputs from the instruction memory 104, the branch history table 110, and the instruction execution unit 106. The first of these inputs (i.e., the one received from instruction memory 104) allows the instruction fetch unit 102 to determine if a previously addressed instruction was a branch instruction. If so, the second of the inputs (i.e., the one received from the branch history table 110) provides dynamic prediction information which allows the instruction fetch unit 102 to determine whether a branch identified by the branch instruction is mostly taken or mostly not taken. The third of the inputs (i.e., the one received from the instruction execution unit 106) provides an indication as to whether a branch was taken or not taken. If the instruction fetch unit 102 determines that it erroneously predicted the outcome of a branch instruction, then steps must be taken to clear the instruction pipeline, and otherwise recover from the erroneous prediction.

Addresses generated by the instruction fetch unit 102 are provided to both the instruction memory 104 and the branch history table 110. To provide for pipelined instruction execution, hold 108 is several entries deep, and allows an appropriate entry in the branch history table 110 to be addressed subsequent to a branch instruction's processing through a pipeline in instruction execution unit 106.

The same indication as to whether a branch was taken or not taken is also provided to the branch history table 110, and serves to increment, decrement, or add to the data stored in an entry of the branch history table 110 addressed by hold 108.

In the PA-8000 microprocessor, each entry in the branch history table 110 is maintained by a 3-bit shift register which stores a taken/not taken history of one or more branches. If a branch is taken, a logic "1" is moved into an appropriate shift register. If a branch is not taken, a logic "0" is moved into an appropriate shift register. A branch prediction generated by the branch history table 110 is a logic "1"(meaning mostly taken) if any two of an addressed shift register's history bits hold a logic "1". Otherwise, the branch prediction is a logic "0"(meaning mostly not taken).

In the PA-8200 microprocessor, each entry in the branch history table 110 is maintained by a 2-bit saturating up/down counter. If a branch is taken, an appropriate counter is incremented. If a branch is not taken, an appropriate counter is decremented. Of course, when a counter has reached its maximum count (i.e, saturation), additional increment attempts will have no effect on the counter. Likewise, when a counter has reached its minimum count (i.e, saturation), additional decrement attempts will have no effect on the counter. A branch prediction generated by the branch history table 110 is equal to the most significant bit (MSB) of a counter.

A problem with the branch history tables 110 of both the PA-8000 and PA-8200 microprocessors is that when a single entry is shared by more than one branch, and one of the branches is mostly taken, while another is mostly not taken, conflicts result and the outcome of a branch instruction can be predicted incorrectly.

Referring now to FIG. 2, which illustrates a preferred embodiment of the invention, one will note the appearance of instruction fetch unit 202, instruction memory 204, instruction execution unit 206, hold 208, and branch history table 214. These components operate similarly to those illustrated in FIG. 1, and may, in fact, be identical to those illustrated in FIG. 1.

As in FIG. 1, one output of instruction fetch unit 202 is an instruction address. This address is provided to the instruction memory 204 for retrieval of an instruction stored therein, and is further provided to the branch history table 214 for retrieval of historical prediction information relating to an addressed branch instruction.

Hold device 208 may comprise one or more registers which latch the instruction addresses generated by instruction fetch unit 202. Since branch prediction is typically only necessary in out-of-order and/or pipelined computer systems, hold device 208 will most likely comprise a plurality of registers which maintain the addresses of recently fetched instructions (most likely just branch instructions). In this manner, an appropriate entry in the branch history table 214 may be addressed and updated several cycles after a branch instruction is addressed (e.g., after the branch instruction has advanced through a pipeline of instruction execution unit 206). Means may be provided for clearing or advancing entries in hold device 208 upon execution or retirement of an instruction.

The instruction memory 204 may be a cache which is internal or external to a microprocessor, or in the alternative, may be part of a main memory. It is also possible that instruction memory 204 may comprise a combination of caches and main memory.

The instruction execution unit 206 may be any one or more of an integer arithmetic logic unit (integer ALU), a floating-point multiply accumulate unit (FMAC), a shift/merge unit, a divide/square-root unit (divide/SQRT), an instruction reorder buffer (IRB), or other execution unit. The instruction execution unit 206 produces a signal 222 which is indicative of whether a branch identified in a branch instruction was taken or not taken.

In the preferred implementation, static prediction information is saved 404 (FIG. 4) in one or more data storage locations of instruction memory 204, and is saved as a predecode bit stored in conjunction with various of the instructions saved in the instruction memory 204. The decode unit 210 therefore reads the appropriate predecode bit 220, and routes same to logic gates 212 and 216. A hold device 228, possibly similar to hold device 208, allows static information to be provided to logic gate 212 subsequent to a branch instruction's processing through a pipeline in instruction execution unit 106.

Logic gate 212 provides a branch history update signal 218 to branch history table 214. Inputs to the logic gate 212 comprise static prediction information 220 from decode unit 210, and the signal 222 from instruction execution unit 206 which is indicative of whether a branch identified in a branch instruction was taken or not taken. In a preferred embodiment, logic gate 212 is a single exclusive OR gate (XOR gate). If, for example, static prediction information 220 comprises a plurality of bits, or prediction history information maintained in the branch history table 214 depends on factors other than static prediction information 220 and the success thereof, logic gate 212 might comprise a more complex XOR gate, or even an alternate form of logic gate.

Branch history table 214 comprises a plurality of entries. Each entry may be maintained 402 (FIG. 4) in a number of ways. For example, an entry may be maintained by a saturating up/down counter, a shift register, or other means of latching data. In a preferred embodiment, each entry of the branch history table is maintained by either a 2-bit up/down saturating counter (as in the HP-8200), or a 3-bit shift register (as in the HP-8000).

Assuming a branch history table 214 of 2-bit counters, the branch history update signal 218 (or just "Update Signal" in the following table) advances a counter from its current state to a next state as illustrated in the following table:

| Current State | Update Signal | Next State |
| --- | --- | --- |
| 00 | 0 | 00 |
| 00 | 1 | 01 |
| 01 | 0 | 00 |
| 01 | 1 | 10 |
| 10 | 0 | 01 |
| 10 | 1 | 11 |
| 11 | 0 | 10 |
| 11 | 1 | 11 |

When a counter has reached its maximum count, additional increment signals (logic "1" s in the above example) have no effect on the counter (i.e., the counter is saturated, and will no longer increment). Likewise, when a counter has reached its minimum count, additional decrement signals (logic "0" s in the above example) have no effect on the counter.

If the branch history table 214 comprises a number of 2-bit counters, the information 226 output to logic gate 216 might comprise only the most significant bit (MSB) of an addressed counter. If, on the other hand, entries in the branch history table 214 are maintained by 3-bit shift registers, the information 226 output to logic gate 216 might comprise the MSB of a sum of a shift register's bits.

Control logic for reading and/or writing a branch history table 214 is known in the art, and is beyond the scope of this disclosure. The branch history table 214 illustrated in FIG. 2 is presumed to include such control logic.

Logic gate 216 provides a branch prediction output 224, which is indicative of whether a branch instruction will be taken or not taken, to instruction fetch unit 202. The branch prediction output 224 comprises dynamic prediction information. The outcome of a branch instruction addressed by instruction fetch unit 202 is therefore predicted in response to both static 220 and dynamic 226 prediction information (unless a computer program which is being executed was not compiled with static prediction information—in this case, the outcome of a branch instruction addressed by instruction fetch unit 202 will only be predicted in response to dynamic prediction information 226). Inputs to the logic gate 216 comprise static prediction information 220 from decode unit 210, and information 226 derived from at least one entry in the branch history table 214. In a preferred embodiment, logic gate 216 is a single XOR gate. But again, for example, if static prediction information 220 comprises a plurality of bits, or if prediction of a branch instruction's outcome depends on factors other than static prediction information 220 and information 226 maintained in the branch history table 214, logic gate 216 might comprise a more complex XOR gate, or even an alternate form of logic gate.

If it is desirable that a computer system be able to execute computer programs which do not comprise static prediction information, then instruction fetch unit 202 might comprise, or be responsive to, a branch prediction mode indicator (not shown) which signals whether a computer program does or does not comprise static prediction information. If a computer program does not comprise static prediction information, then signal 220 can be driven to a logic "0" so that 1) the outputs 218, 224 of logic gates 212 and 216 are solely dependent on the taken/not taken information 222 provided by instruction execution unit 206. Note that in this mode, entries in the branch history table 214 which are shared by more than one branch are subject to update by branches having conflicting outcomes, and the probability of erroneous branch prediction is increased.

Assuming that the branch history table 214 comprises a number of 2-bit saturating up/down counters, a logic "0" hint indicates that a branch is mostly taken, a logic "1" hint indicates that a branch is mostly not taken, a logic "1" signal indicates that a branch identified in a branch instruction was actually taken, and a logic "0" signal indicates that a branch was actually not taken, the apparatus 200 shown in FIG. 2 operates as follows. When a first well-behaved branch is hinted as taken (hint 0), and is actually taken (outcome 1), an appropriate counter in the branch history table 214 is incremented (0 XOR 1=1). Likewise, when a second branch is hinted as not taken (hint 1), and is actually not taken (outcome 0), an appropriate counter in the branch history table 214 is incremented (1 XOR 0=1). If the first and second branches share the same entry (e.g., counter) in the branch history table, the histories for these branches will not interfere with one another. For example, assume that a counter holds an initial value of "00", and is then incremented once after the first branch is taken as hinted, and once after the second branch is not taken as hinted. After two increments, the counter holds a value of "10". If the first branch is again hinted as taken (hint 0), and the MSB of the counter is read as "1", logic gate 216 produces a branch prediction of "1"(0 XOR 1=1), which is interpreted by the instruction fetch unit 202 to mean taken. Alternatively, if the second branch is again hinted as not taken (hint 1), and the MSB of the counter is read as "1", logic gate 216 produces a branch prediction of "0"(1 XOR 1=0), which is interpreted by the instruction fetch unit 202 to mean not taken.

Of course, if the hints were always correct, then branch prediction could be based solely on the hints, and branch prediction hardware 200 would be unnecessary. However, assume now that the first and second branches were hinted correctly during their first execution, and that their shared counter in the branch history table stands at "10". If the first branch now switches its behavior, and becomes mostly not taken, its incorrect hint (hint 0) is exclusively ORed with its outcome of not taken (outcome 0), and the counter is decremented (0 XOR 0=0). With the counter now standing at "01", a subsequent prediction of the first branch, which has now become mostly not taken, would be correct (the MSB of the counter is now "0", and when exclusively ORed with a hint of "0" produces a logic "0" which results in a prediction of not taken—in spite of the hint).

To summarize, the primary advantage of the methods 300, 400 and apparatus 200 disclosed herein is that when two well-behaved branches which share an entry in a branch history table 214 are hinted correctly, dynamic prediction histories for the two branches will not interfere with one another—even when one of the branches is mostly taken, and the other is mostly not taken. Also, when a branch is not hinted correctly, but 1) does not share an entry in the branch history table 214 with any other branch, or 2) is executed 302, 406 (FIGS. 3, 4) repeatedly (or significantly more often than the branch which shares its entry in the branch history table 214), then the dynamic information stored in the branch history table 214 allows the instruction fetch unit 202 to make a correct prediction of a branch outcome in lieu of the incorrect hint. The only time well-behaved branches will interfere with each other is when two branches share an entry in the branch history table 214, and one is hinted correctly while the other is hinted incorrectly. This is in contrast to previous branch prediction schemes, wherein two well-behaved branches, one of which is mostly taken and one of which is mostly not taken, will always interfere with one another if they share an entry in the branch history table 214.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of predicting outcomes of a plurality of branch instructions executed in a microprocessor, comprising:
   a) maintaining a branch history table comprising a plurality of entries;
   b) maintaining static prediction information for a plurality of branch instructions;
   c) predicting outcomes of the plurality of branch instructions, each outcome being predicted at least partly in response to:
      i) the static prediction information; and
      ii) an entry in the branch history table;
   d) after executing each of the plurality of branch instructions, updating an entry in the branch history table at least partly in response to whether the static prediction information was correct.

2. A method as in claim 1, further comprising:
   a) maintaining each entry in the branch history table by means of a saturating up/down counter; and
   b) after executing a given one of the plurality of branch instructions,
      i) incrementing a predetermined saturating up/down counter in the branch history table if the static prediction information for the given one of the plurality of branch instructions was correct; and
      ii) decrementing a predetermined saturating up/down counter in the branch history table if the static prediction information for the given one of the plurality of branch instructions was incorrect.

3. A method as in claim 1, further comprising:
   a) maintaining each entry in the branch history table by means of a shift register; and
   b) after executing a given one of the plurality of branch instructions, shifting into a predetermined shift register of the branch history table an indication as to whether the static prediction information for the given one of the plurality of branch instructions was correct.

4. A method as in claim 1, wherein maintaining static prediction information for a plurality of branch instructions comprises encoding a compiler generated hint in each of the plurality of branch instructions, the compiler generated hints being the static prediction information.

5. A method of reducing interference in a branch history table of a microprocessor, comprising:
   a) predicting outcomes of a plurality of branch instructions in a computer program, at least partly in response to:

i) hints encoded in the branch instructions; and ii) entries in a branch history table; and b) after execution of a given branch instruction, updating an entry in the branch history table at least partly in response to whether the hint encoded in the given branch instruction was correct.

6. A method as in claim 5, wherein each of one or more entries in the branch history table correspond to two or more branch instructions.

7. A method as in claim 5, wherein:

a) the outcome of a given branch instruction is predicted at least partly in response to a predetermined entry in the branch history table; and b) after execution of the given branch instruction, the predetermined entry in the branch history table is updated.

8. A method as in claim 5, further comprising:

a) maintaining each entry in the branch history table by means of a saturating up/down counter; and p1 b) after executing a given branch instruction, i) incrementing a predetermined saturating up/down counter in the branch history table if the hint encoded in the given branch instruction was correct; and ii) decrementing a predetermined saturating up/down counter in the branch history table if the hint encoded in the given branch instruction was incorrect.

9. A method as in claim 5, further comprising:

a) maintaining each entry in the branch history table by means of a shift register; and b) after execution of a given branch instruction, shifting into a shift register of the branch history table an indication as to whether the hint encoded in the given branch instruction was correct.

* * * * *

UNITED STATES PATENT AND TRADEMARK OFFICE
CERTIFICATE OF CORRECTION

PATENT NO. : 6,353,882 B1
DATED : March 5, 2002
INVENTOR(S) : Douglas B. Hunt

It is certified that error appears in the above-identified patent and that said Letters Patent is hereby corrected as shown below:

Column 10,
Line 3, after "counter; and" delete "p1" and begin a new line

Signed and Sealed this

Tenth Day of August, 2004

JON W. DUDAS
*Acting Director of the United States Patent and Trademark Office*